Jan. 23, 1968  K. GERBER  3,364,868
ROTARY PISTON ENGINE
Filed Jan. 17, 1967  3 Sheets-Sheet 1
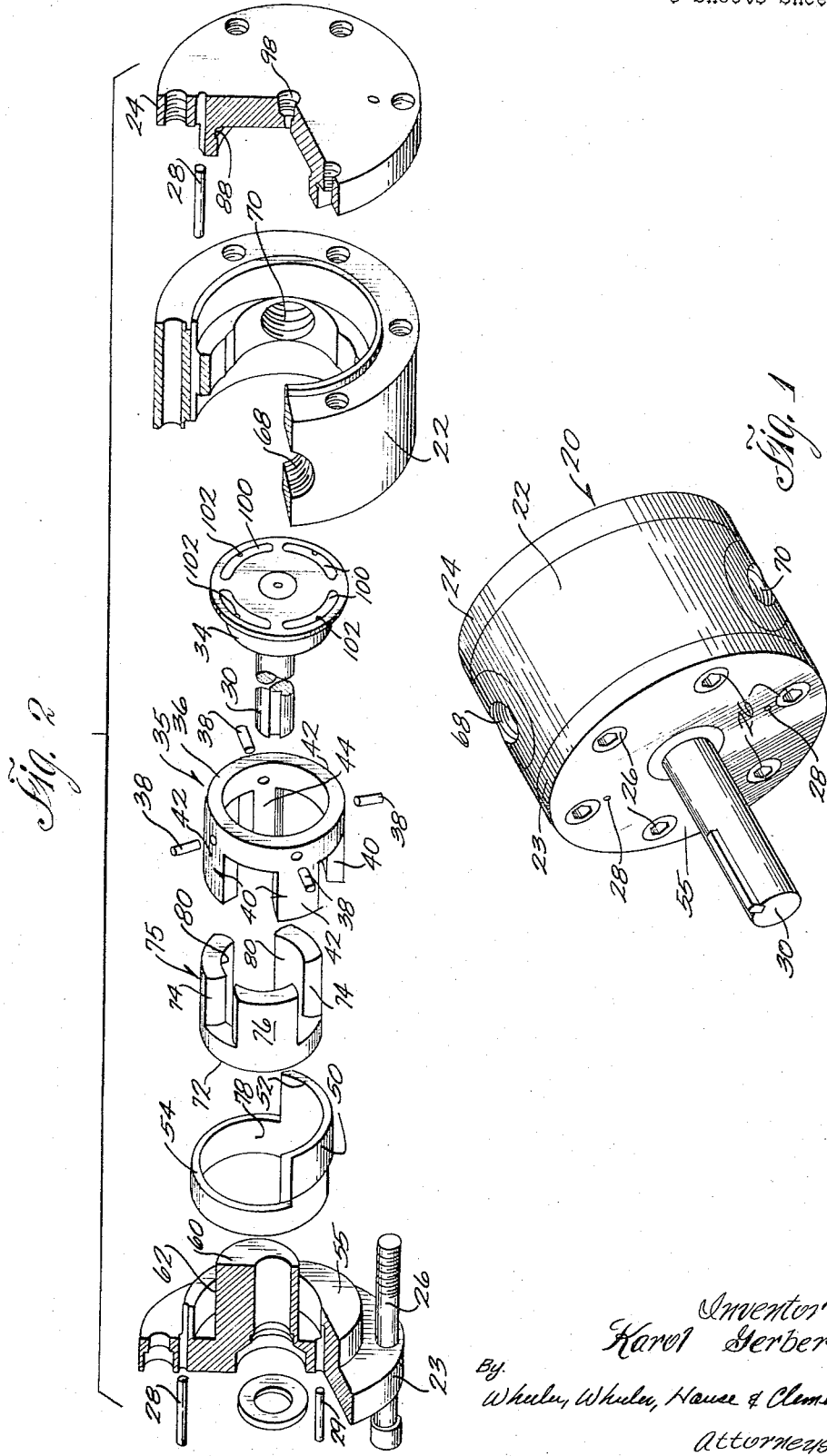

Jan. 23, 1968     K. GERBER     3,364,868
ROTARY PISTON ENGINE
Filed Jan. 17, 1967     3 Sheets-Sheet 2
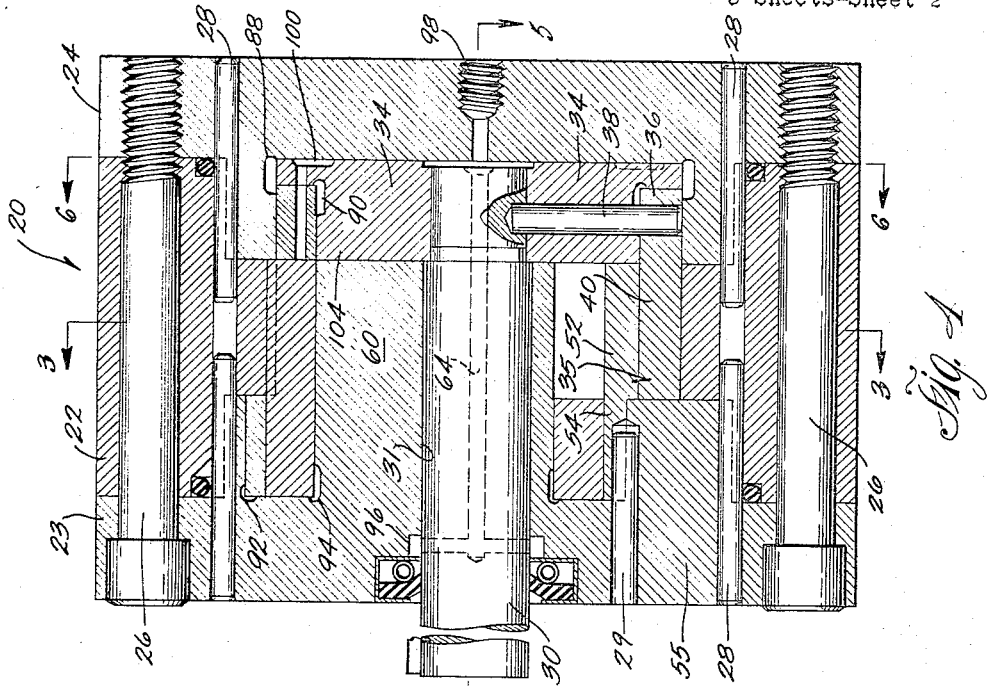
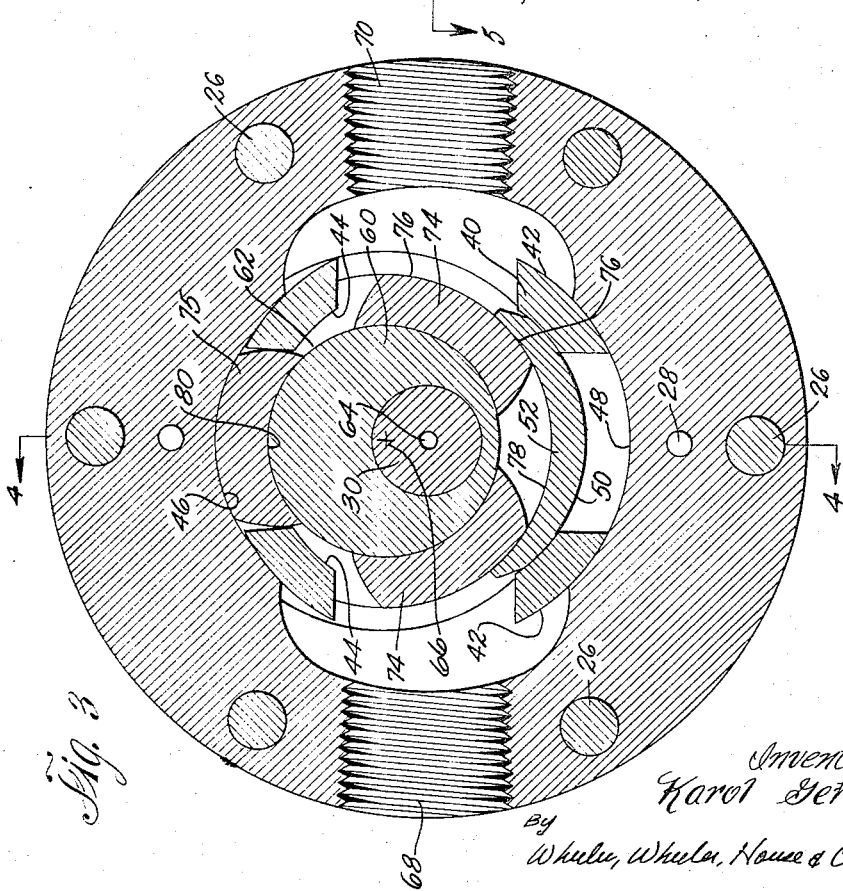
Inventor
Karol Gerber
By Wheeler, Wheeler, House & Clemency
Attorneys

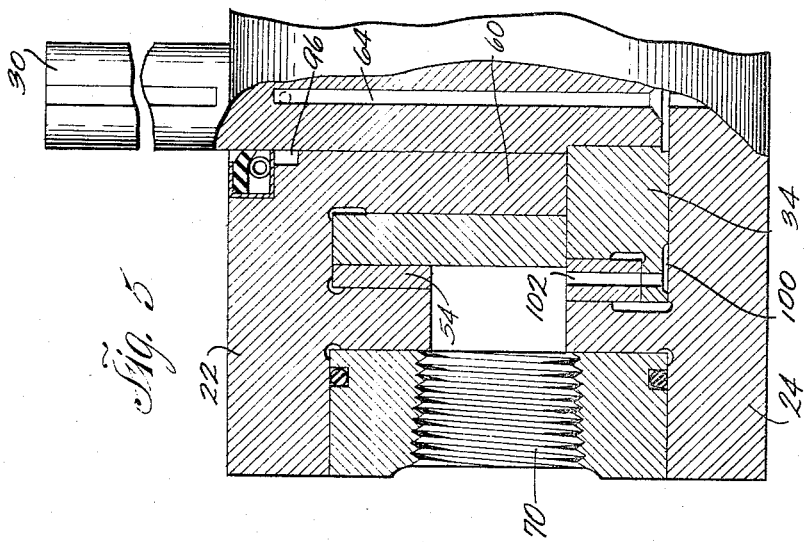
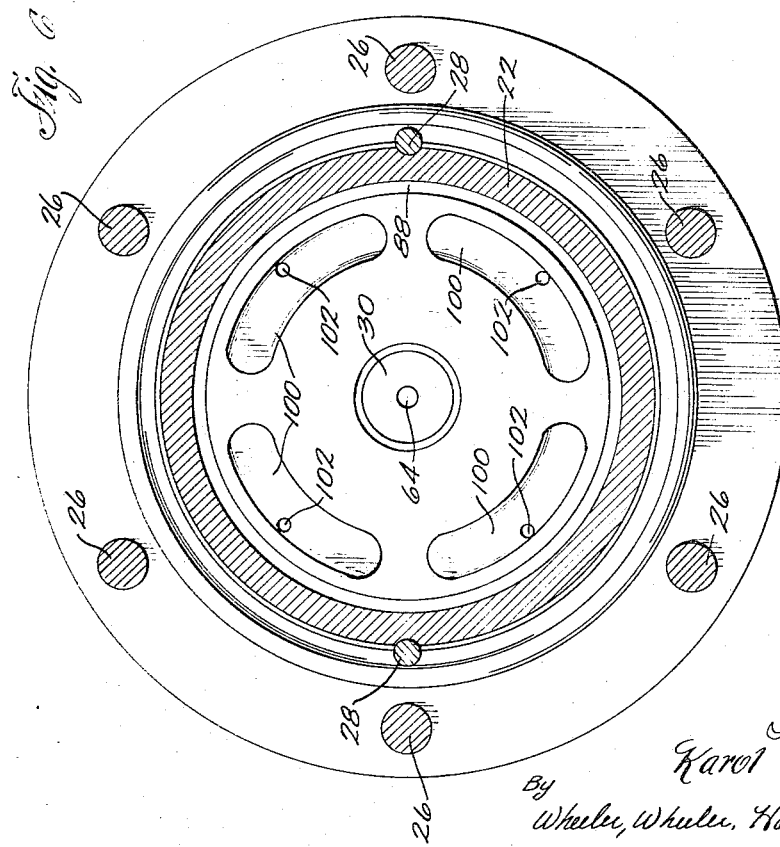

United States Patent Office 3,364,868
Patented Jan. 23, 1968

3,364,868
ROTARY PISTON ENGINE
Karol Gerber, Cudahy, Wis., assignor to Koerper Engineering Associates, Inc., Milwaukee, Wis., a corporation of Wisconsin
Filed Jan. 17, 1967, Ser. No. 609,908
4 Claims. (Cl. 103—126)

ABSTRACT OF THE DISCLOSURE

The title is used generically to cover a pump and a motor or an internal combustion engine embodying the structure claimed.

The design is symmetrical. As a pump or a motor, the engine will operate equally well in either direction. A power gear and an idler gear have teeth which are few in number and have substantial arcuate extent for sealing purposes. The gears rotate on offset axes in a casing having complementary sealing surfaces whereby to obtain variation in volumetric capacity with non-reciprocating motion. Interiorly the casing has a boss on the periphery of which the idler gear rotates, and a crescent baffle which has sealing contact with the outer periphery of the idler gear and the inner periphery of the power gear. The casing has cylindrical seal surfaces concentric with the offset axes and respectively engaged by the outer peripheries of respective gears. No seal between gear tooth faces is required. Thus all sealing is accomplished on fixed radius surfaces, or on flat planes.

Summary of invention

Driving and driven rotors are offset in a plane intermediate inlet and outlet ports in the engine casing. An idler gear is mounted on a boss and the power gear upon a shaft which preferably has a bearing in the boss. The two gears are in the nature of crown gears comprising rings from which teeth project axially in opposite directions. For convenience the gear which is encircled is called herein an internal crown gear and the gear which encircles it is called an external crown gear. The inner and outer faces of the teeth are cylindrical. At one side of the boss, the inner surface of the casing is concentric with the periphery of the boss and the teeth of the idler gear have cylindrical inner and outer surfaces in sealing contact simultaneously with the casing and with the boss. At the other side of the boss is a crescent baffle having an internal surface concentric with the boss and in sealing engagement with the outer peripheries of the idler gear teeth which also seal against the boss. The outer surface of the baffle and the proximate wall of the casing are concentric with the offset axis of the power gear, the teeth of the power gear being concurrently in sealing engagement with the baffle and this portion of the casing wall. The casing has planiform surfaces engaged by the ends of the respective gears. These planiform surfaces and the aforesaid cylindrical sealing surfaces provide the seal between the inlet and outlet ports of the casing. The only contact between the teeth of the respective gears is for driving purposes and not for sealing purposes. The teeth of the power gear may be planiform at their side surfaces, the teeth of the idler gear being involute to facilitate driving mesh.

Background of the invention

In rotary engines of the general category herein disclosed, seal has heretofore been required between the teeth of the inner gear and the teeth of the outer gear. Such prior art devices have approximately half the hydraulic torque transmitted to each gear.

In the instant device, the larger gear is the power gear and is mounted on a shaft. There is no torque transmitted by the idler gear. The structure is very compact because the only bearing required by this shaft is within the internal boss about which the idler gear rotates.

The casing provides inlet and exhaust ports and has two diametrically opposite cylindrical sealing surfaces, one of which is concentric with each such gear, and with which the successive teeth of the respective gears have broad sealing contact. While the invention is not limited to any particular number of teeth on the respective gears, it is desirable that the number be as small as practicable. In the preferred construction, the power gear has four teeth and the idler gear, three. The small number of teeth permits each tooth to have very substantial arcuate extent, thereby inherently strengthening the tooth and providing maximum bearing seal surfaces. The angular extent of the casing and baffle and tooth surfaces so far exceeds the spacing between the power or idler gear teeth that there is always at least one of the gear teeth which has extensive sealing contact with the baffle and/or the casing at all times.

Because the tooth structure is inherently strong, it is not necessary to use high strength hardened materials. Normally the gears will be made of unhardened cast iron, rather than steel, but they may also be made of other materials or synthetic resin, according to the use to which the engine is to be put. The simplicity of the design of the parts permits economical mass production and the resulting engine has a high ratio of output to weight and size.

In the preferred embodiment disclosed, the respective gears are in the nature of crown gears. Only the idler gear teeth have involute faces. The power gear teeth have only flat driving faces, with parallel interspaces. They have mutually remote supporting rings from which the teeth project aixally into position for displacement interaction with one another. The respective supporting rings are at opposite ends of the resulting gear structure. As the power gear rotates, the idler gear is driven with no substantial resistance. In the course of the rotation, the teeth of the idler gear and those of the power gear have capacity varying relative movement radially in and out of the intertooth spaces of the respective opposing gear, such movement effecting displacement of fluid, as in the case of a pump, or being effected by such displacement, as in the case of a motor.

The supporting boss has a multiple purpose. It provides balanced support for the power gear while, when used in conjunction with a crown type idler gear, it greatly reduces the total radial loading from the idler gear on the boss. The high hydraulic pressure acts directly on the boss rather than being transmitted to it by the pressure acting on the idler gear.

The device differs radically from other engines superficially resembling the structure described in that no line seals are required between the teeth of the respective gears. In lieu thereof, broad sealing areas are provided between the teeth and the stationary sealing surfaces above described. In addition, this engine is unique in that only one rotor is torqued and the other operates idly.

Brief description of the drawings

In the drawings:

FIG. 1 is a view in perspective of an engine embodying the invention.

FIG. 2 is a diagrammatic exploded view showing in perspective the component parts of the engine.

FIG. 3 is an enlarged detail view taken in transverse section on the line 3—3 of FIG. 4.

FIG. 4 is a view generally in axial section on the line 4—4 of FIG. 3.

FIG. 5 is a view taken on line 5—5 of FIG. 4.
FIG. 6 is a view taken on line 6—6 of FIG. 4.

*Detailed description*

The casing 20 (FIGS. 1 and 4) comprises an annular body portion 22 to which closures 23 and 24 are attached as by means of cap screws 26 and dowels 28. The power shaft 30 has a bearing 31 in the closure 23 and may be provided with a head flange 34 to which the power gear 35 has its ring 36 connected as by radial pins or dowels 38 (FIG. 4).

The ring gear teeth 40 project axially from the ring 36 and have external cylindrical bearing surfaces at 42 and internal cylindrical bearing surfaces at 44. The external surfaces 42 are closely fitted to the cylindrical bearing surfaces 48 of the casing member 22. Inner cylindrical surfaces 44 also have bearing engagement with the external bearing surface 50 of a crescent baffle 52 which projects axially from a mounting ring 54 fixed with reference to the closure 23 by means which include the dowel 29 as shown in FIG. 4. As best shown in FIGS. 2 and 4, the dowels 29 are so positioned as to lie partially within the boss 55 on closure 23 and partially within the ring 54 which positions the crescent baffle 52. The dowels 28, as shown in FIG. 1, are so positioned to lie partially within the closure of the peripheral annulus 23–24 and partially within the two faces of the internal annulus of the housing member 22. The dowels 28 not only position the two mating parts but provide a positive seal between the high and the low pressure chambers. The seal is at right angles to the mating surfaces.

The bearing 31 for shaft 30 extends through a boss 60 which has a generally cylindrical bearing surface 62 offset radially from the axis 64 of shaft 30 (FIG. 3).

The offset is in a direction away from the crescent baffle 52 in a plane which includes the shaft axis 64 and the axis 66 of the boss 60, such plane being between the inlet and outlet ports 68 and 70 with which the casing member 22 is provided (FIG. 3). As will be explained, either port may be an inlet and the other may be an outlet port.

Cooperating with the power rotor 35 which comprises ring 36 and teeth 40 is an idler gear 75 comprising ring 72 and axially projecting teeth 74. The teeth 74 are approximately equal in angular extent to the intertooth spaces between the teeth 40 of the power gear, being rotatably driven therefrom. However, this is not essential, being merely to avoid an extraneous driving connection, as there is no seal necessary between the several teeth. The teeth 74 of the idler gear have cylindrical external surfaces 76 complementary to the inner cylindrical surface 78 of the crescent baffle 52 and to cylindrical surface 46 of the casing. The cylindrical inner surfaces 80 of the teeth 74 of the idler gear 75 are in substantially continuous bearing and sealing contact with the exterior cylindrical surface 62 of the boss 60.

The angular extent of the fixed bearing and sealing surfaces engaged by the several teeth preferably exceeds materially the angular spaces between teeth, the result being that there is always a substantial cylindrical surface seal between the respective gears and the stationary parts engaged thereby. Thus, referring to FIG. 3, it will be noted that two consecutive teeth 74 of the idler gear are simultaneously in contact with the seal surfaces 48 of the casing intermediate the inlet and outlet ports 68 and 70. When the number of teeth is small, as shown, the angular extent of the sealing surface of each tooth which is thus engaged may be approximately fifty percent of the total angular extent of the external bearing surface 76 of the respective teeth, so that the total of the sealing surface between the inlet and outlet is always sufficient for sealing. This is one of the advantages of the invention.

Similarly, there is a substantial peripheral seal between each of the teeth 40 and the external seal surface 50 of the crescent baffle 52. When the teeth 40 pass between the surface 48 of the housing and the spaced concentric external bearing surface 50 of the baffle, the teeth 40 are in concurrent sealing engagement with both. Likewise, there is substantial angular extent of seal contact between the idler gear teeth 74 and the surface 78 of the baffle. At the other side of the casing, the idler gear teeth provide the seal, being concurrently engaged with the concentric surfaces 46 and 62 of the casing 22 and boss 60 respectively.

When the rotary piston engine is operated as a pump, the power gear is caused to rotate by torque applied to shaft 30. The teeth 40, by reason of their mesh with teeth 74 of the idler gear 75, will cause the idler gear 75 to turn. The idler gear has no torque load. Due to the offset axes, its teeth 74 move generally radially inwardly and outwardly between the teeth 40 of the power gear, thus increasing and decreasing the volumetric capacity of the space between the teeth of the power gear to receive fluid from whichever port is the intake port and to discharge such fluid toward whichever port is the outlet port of the engine. This will depend on the direction of rotation of shaft 30. Fluid movement toward the outlet port is always substantially continuous since, as one power gear tooth arrives at the port, another one is leaving to equal it in volumetric displacement so that there is no pulsation.

When the rotary piston engine is operating as a motor, fluid under pressure is supplied through one of the ports. Regardless of the port through which the fluid is supplied, it will be found that in one direction of rotation of the power gear 35, the space between the power gear tooth 40 will be expanding to receive the pressure fluid from the pressurized port. At the opposite side of the engine, the teeth will be meshing to expel the fluid into the lower pressure port. Since only the power gear has tangential unbalance, the only work which is done is done directly by the rotation of the power gear. There is no work done in the relative intermeshing of the gear teeth as they replace the fluid from the intertooth spaces.

Circular channels such as 88, 94 are located to pick up leaking high pressure fluid and guide it to flow around the low pressure bearing path of the two gears, thus partially equalizing the remaining high pressure radial loads and at the same time partially floating the rotating gears.

Circular channels 96, bore 64 and circular cavity 92 are located to intercept fluid which is leaking along the shaft (thereby providing self-lubrication) and to feed it back to the reservoir.

Recesses 100 communicate with the intertooth spaces through ducts 102, thus balancing the axial thrust of the high pressure on the power gear.

I claim:

1. A rotary piston engine comprising a casing having inlet and outlet ports, two gears within the casing on offset axes and one of which encircles the other, respective means supporting the gears for rotation and including at least one shaft connected with one of the gears, the gears having teeth which mesh at one side of the casing and are out of mesh at the other side thereof, a crescent shaped baffle interposed between the teeth of said gears where such teeth are out of mesh with each other, means for sealing external surfaces of the respective gears against internal surfaces of the casing, said means including broad terminal faces on the peripheries of the teeth of each of said gears and casing surfaces which are concentric with one of said gears at one side of the shaft and concentric with the other of said gears at the other side of the shaft, the gear which encircles the other having teeth with substantially flat driving faces with parallel sided interpaces, the intervening teeth of the other gear having lateral surfaces which are convex and approximately involute, and said intervening teeth being fewer in number than the teeth of the encircling gear, the difference in number being minimum.

2. A rotary piston engine comprising a casing having inlet and outlet ports, two gears within the casing on offset axes and one of which encircles the other, respective means supporting the gears for rotation and including at least one shaft connected with one of the gears, the gears having teeth which mesh at one side of the casing and are out of mesh at the other side thereof, a crescent shaped baffle interposed between the teeth of said gears where such teeth are out of mesh with each other, means for sealing external surfaces of the respective gears against internal surfaces of the casing, said means including broad terminal faces on the peripheries of the teeth of each of said gears and casing surfaces which are concentric with one of said gears at one side of the shaft and concentric with the other of said gears at the other side of the shaft, the respective gears having axially spaced members from which the respective teeth project axially in opposite directions toward positions for mesh.

3. An engine according to claim 2 in which said axially spaced gear members have planiform seal surfaces for which the casing is provided with complementary surfaces, the said cylindrical surfaces of the gear teeth, the casing and the baffle, together with the complementary planiform surfaces of the said members and the casing, providing the total seal between the ports of the casing independently of the meshing surfaces with which said teeth are provided, one such gear comprising a power gear having the function of driving the other gear, said other gear comprising an idler gear.

4. A rotary piston engine comprising the combination of power and idler gears comprising internal and external crown gears differing in number of teeth and having rings from which their respective teeth project axially in opposite directions on axes offset in a diametrical plane common to the axes of said gears, a casing in which said gears are operatively mounted for rotation, said casing having inlet and outlet ports at opposite sides of said plane, teeth of said gears having external and internal cylindrical surfaces of substantial circumferential extent, a boss encircled by the teeth of the internal gear and with portions of which the inner surfaces of the internal gear teeth individually have bearing and sealing contact, the casing and boss being provided at one side of the boss with sealing surfaces coaxial with the idler gear and with which the external and internal surfaces of the teeth of the idler gear respectively have sealing contact, a crescent baffle interposed between the teeth of the idler gear and teeth of the power gear at the other side of the boss, said baffle having an internal cylindrical surface concentric with the boss and with which the external cylindrical surface of the internal gear teeth are in sealing relation, the said casing and the external surface of the said baffle having cylindrical surfaces concentric with each other and with the axis of the external gear and spaced by a radial distance substantially equal to the radial extent of the external gear teeth and with which inner and outer surfaces of successive external gear teeth are in concurrent sealing relation.

References Cited

UNITED STATES PATENTS

| | | | |
|---|---|---|---|
| 1,724,008 | 8/1929 | Dinesen | 103—126 |
| 1,994,397 | 3/1935 | Loveridge et al. | 103—126 |
| 2,124,140 | 7/1938 | Foster et al. | 103—126 |
| 3,224,198 | 12/1965 | Schimkat | 103—126 |
| 3,276,388 | 10/1966 | Schimkat | 103—126 |

DONLEY J. STOCKING, *Primary Examiner.*

WILBUR J. GOODLIN, *Examiner.*